Feb. 19, 1929.                                                          1,702,569
C. A. OLSON ET AL
BRAKE RELINING MACHINE
Filed Sept. 12, 1927

Inventors
C.A. OLSON, F.L. BUCH
And T.E. BROOKS
By Earl M. Sinclair
Attorney

Patented Feb. 19, 1929.

1,702,569

UNITED STATES PATENT OFFICE.

CARL A. OLSON, FREDRICK L. BUCH, AND THOMAS E. BROOKS, OF CLARINDA, IOWA, ASSIGNORS TO LISLE MANUFACTURING COMPANY, OF CLARINDA, IOWA, A CORPORATION OF IOWA.

BRAKE-RELINING MACHINE.

Application filed September 12, 1927. Serial No. 218,983.

The object of our invention is to provide an improved construction for a machine especially designed for inserting and applying rivets for fastening linings to brake bands or similar objects.

A further object of the invention is to provide a machine capable of holding a rivet, locating a hole in a brake band or the like, compressing the brake band and brake lining, forcing the rivet through the brake lining, countersinking the rivet head into the brake lining and forming a head on the opposite end of the rivet, all with a single stroke of a lever.

Another object of our invention is to provide an improved construction for a cushioned support for a rivet and the work object.

Still another object is to provide an improved construction for the riveting mechanism and means for mounting it, whereby it has a delayed movement for the riveting operation after the initial movement which locates the hole through which the rivet is to be inserted.

With these and other objects in view, our invention consists in the construction, arrangement and combination of elements hereinafter set forth, pointed out in the claims and indicated by the accompanying drawing in which:

Figures 1, 2:
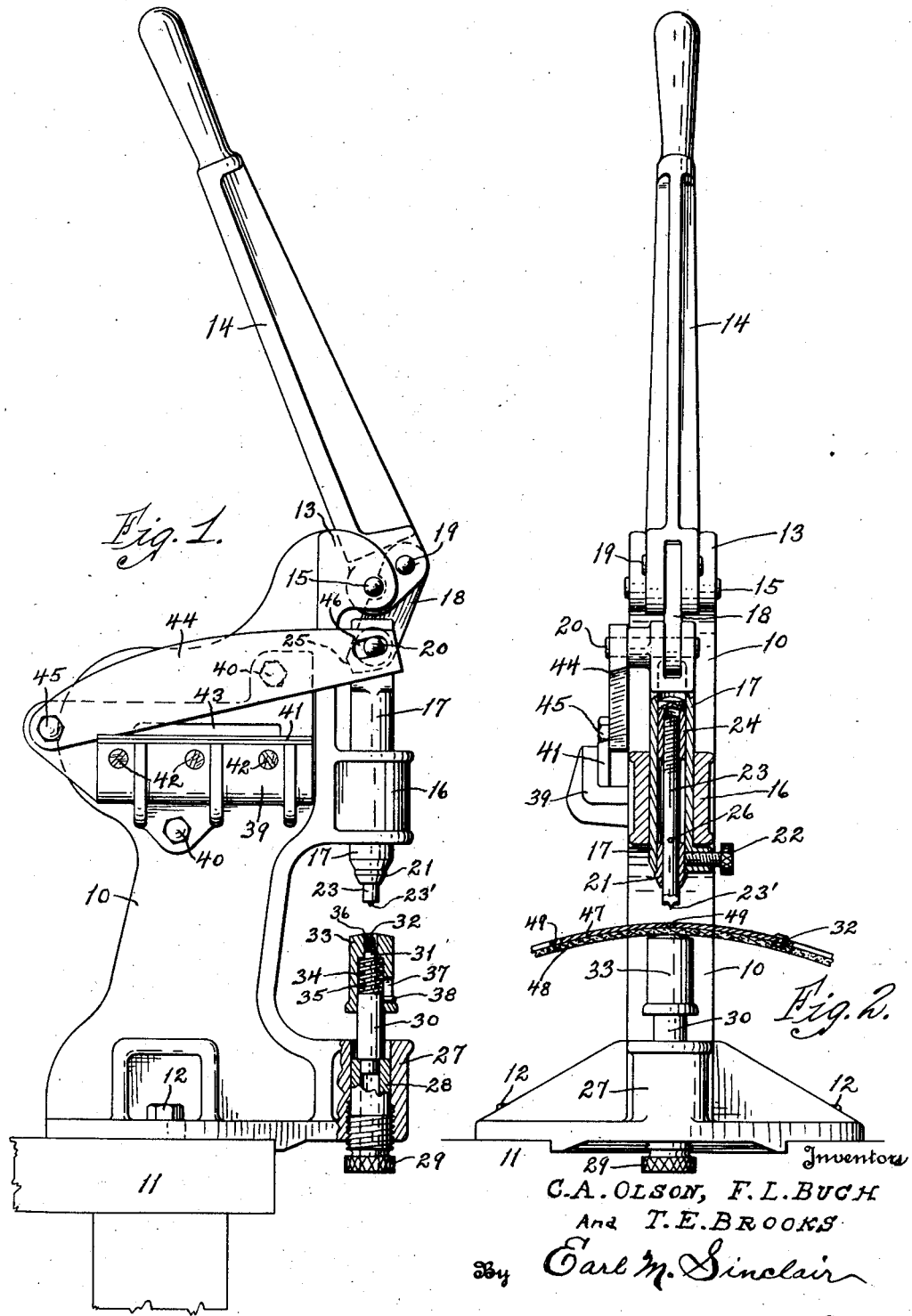
Fig. 1 is a side elevation of the complete machine, partly in section through the spring-cushioned seat or rest.
Fig. 2 is a front elevation of the machine, partly in section through the sleeve which supports the riveting device.

In the construction of the machine as shown, the numeral 10 has been employed to designate generally, the main frame which may be mounted on a suitable support such as a bench 11 and secured thereto as by screws 12. At its upper end the frame 10 is formed with a forwardly extending projection 13 and a lever 14 is fulcrumed on a pin 15 carried by said projection. Below the projection 13 the frame is formed with a vertical slide bearing 16 in which a sleeve 17 is arranged for reciprocation. A link 18 is pivoted at its upper end to the lever 14 by means of a pin 19 located just forwardly of the fulcrum 15 of the lever and said link is pivotally connected at its lower end to the sleeve 17 by means of a pin 20. A bushing 21 is adjustably mounted in the lower end of the sleeve 17 and is held in adjusted position therein by means of a thumb screw 22. A riveting set 23 is slidably mounted in the bushing 21 and has its lower end portion projecting therefrom and formed with a suitable riveting point 23'. The set 23 is threaded at its upper end and a hardened steel plunger 24 is internally threaded and adjustably mounted on said set. The plunger 24 is slidably mounted in the sleeve 17 and has a rounded or convex upper end adapted to be engaged by a nose 25 (dotted lines Fig. 1) formed on the lower rear side of the link 18 below and at the rear of the pivot 20. Downward movement of the riveting set 23 is limited by a pin 26 which engages the upper end of the bushing 21, as shown in Fig. 2.

As its lower end the frame 10 is formed with a bearing 27 in vertical alignment with the bearing 16. A bushing 28 is loosely mounted in the bearing 27 and is adjustably supported therein by means of an adjusting screw 29 threaded in the lower end of the bearing 27. A rivet post 30 is supported on the bushing 28 and is reduced in diameter at its upper end to form a support 31 for a rivet 32 which may be of tubular form. A tubular rest member 33 is slidably mounted on the upper end portion of the rivet post 30 and is formed with a recess 34 to receive a spring 35 coiled on the reduced portion of said post. The rest 33 is formed in its upper end with a bore 36 communicating with the recess 34 and having a sliding fit on the reduced portion of the rivet post 30. The rest member 33 normally is yieldingly supported by the spring 35 a material distance above the rivet seat 31 of the post so that the upper end portion of the bore 36 forms a receptacle for the rivet 32 which is arranged with its head downwardly and resting on the seat 31 and with its tubular portion or smaller end projecting upwardly toward the open end of said bore. The rest member 33 is formed with a vertical slot 37 which receives a pin 38 carried by the post 30.

On one side of the frame 10 a shear body 39 is arranged in horizontal position just rearwardly of the slide bearing 16 and is held in place on the frame by means of cap screws 40. A stationary shear blade 41 is mounted on the body 39 by means of screws 42 and just above the position of said blade, the frame 10 is formed with a transverse opening 43. A movable shear blade 44 is pivoted at one end on the frame by means of a cap screw 45 and the opposite end portion of said blade projects beyond the frame and is formed with a longitudinal slot 46 which receives the pin 20.

In practical operation, a rivet 32 is placed in the position shown in Fig. 1 and an object to be riveted is then held upon the rest member 33. This machine is especially designed for riveting brake bands and linings together and these members are held together in desired relation on the rest member 33 by one hand of the operator while the lever 14 is manipulated with the other hand. The brake band 47 and lining 48 are shown in proper position in Fig. 2 and it will be noted that the band is uppermost and the lining in contact with the rest member 33. The band 47 is formed with a plurality of holes 49 through which the rivets are to be inserted. The lever 14 is moved forwardly through an arc from the position shown and this movement through the link 18 causes a downward movement of the sleeve 17 and members carried thereby. The point 23' of the rivet set 23 enters a hole 49 of the brake band, the brake band being shifted manually if necessary to permit the point 23' to enter the desired hole 49, thus locating the hole in the brake band directly over the rivet 32. Further movement of the lever 14 and sleeve 17 will cause the set 23 and plunger 24 to move upwardly in the sleeve because of the contact of the set with the work object resting on the rest member 33, thereby allowing the lower end of the bushing 21 to press against the brake band 47 and lining 48 and forcing the rest member 33 down against the spring 35. As the rivet post 30 is stationary, it is evident that further movement of the parts will cause the rivet 32 to be forced through the lining 48 so as to protrude through the selected hole 49 in the brake band and into contact with the set point 23'. By this time, the lever 14 has arrived nearly at the end of its stroke and the nose 25 on the link 18 has come into contact with the upper end of the plunger 24. Further movement of the lever 14 causes a pressure to be exerted by the nose 25 upon the plunger 24, which moves said plunger and the set 23 downwardly and pressing upon the tubular end of the rivet 32, causing it to curl and form a head on the outer face of the band 47. The pressure thus applied also causes the head of the rivet to be countersunk in the lining member 48. After the lever 14 has reached its limit of movement, it is moved in a reverse direction to the position shown and the operation is repeated by placing another rivet in the bore 36 of the rest member and causing it to be extended through another hole of the brake band in a similar manner by another forward movement of the lever. If the rivet head is not countersunk the proper or desired amount in the brake lining 48, the adjusting screw 29 may be adjusted upwardly to cause a deeper countersinking or downwardly to cause a lesser countersinking, thus moving the bushing 27 and parts carried thereby upwardly or downwardly as the case may be.

It is obvious that the forward movement of the lever 14 and consequent downward movement of the link 18 and pin 20 will cause an oscillation of the pivoted shear blade 44 whereby its cutting edge is carried by the cutting edge of the stationary blade 41. This action of the blade is utilized to cut off a strip of brake lining such as 48 to the desired length to fit a band such as 47; or the shear may be employed for cutting any other desired members which may be extended through the opening 43 of the frame into the desired relation to the shear blades.

This machine provides a very handy and rapid means for applying the rivets and securing brake linings to their bands and also for performing other operations relative thereto. For instance, it is obvius that a cutting tool may be substituted for the riveting set 23 or a simple punch may be substituted therefor and employed for punching out the old rivets from the band preparatory to applying a new lining, as described.

We claim as our invention:

1. A machine of the class described, comprising a frame, a lever pivoted on said frame, a sleeve arranged for sliding movement in said frame, a link forming a pivotal connection between said lever and said sleeve, a bushing adjustably mounted in one end portion of said sleeve, a set slidably mounted in said bushing and projecting therefrom, a plunger having a threaded connection with the inner end of said set and arranged for sliding movement in said sleeve, and a nose on the link arranged to engage said plunger at a time subsequent to the initial movement of said lever.

2. A machine of the class described, comprising a frame, a lever pivoted on said frame, a sleeve arranged for vertical sliding movement in said frame, a link pivoted to said lever and to the upper end of said sleeve to cause a reciprocation of the sleeve when the lever is oscillated, a bushing adjustably carried by the lower end of said sleeve, a plunger slidably mounted in the upper end of said sleeve, a set adjustably mounted in said plunger and extending slidably through said bushing, a stop member on said set engaging the upper end of said bushing, a work rest carried by said frame and adapted to be engaged by said set whereby the set and plunger are moved upwardly in the sleeve during the initial downward movement of the sleeve, and a projection on the link arranged to engage said plunger at a time subsequent to the initial movement of the lever whereby the set is caused to move downwardly relative to the sleeve and bushing.

3. A machine of the class described, comprising a frame, a lever pivoted on said frame, a sleeve arranged for vertical sliding movement in said frame, a link pivoted to said lever and to the upper end of said sleeve to cause a reciprocation of the sleeve when the lever is oscillated, a bushing adjustably carried by the lower end of said sleeve, a plunger slidably mounted in the upper end of said sleeve, a set adjustably mounted in said plunger and extending slidably through said bushing, a stop member on said set engaging the upper end of said bushing, a rivet post carried by said frame and adapted to support a rivet, a spring-cushioned work rest supported on said post, and a projection on the link arranged to engage said plunger at a time subsequent to the initial movement of the lever whereby the set is caused to move downwardly relative to the sleeve and bushing.

4. A machine of the class described, comprising a frame, a lever pivoted on said frame, a sleeve arranged for vertical sliding movement in said frame, a link pivoted to said lever and to the upper end of said sleeve to cause a reciprocation of the sleeve when the lever is oscillated, a bushing adjustably carried by the lower end of said sleeve, a plunger slidably mounted in the upper end of said bushing, a set connected to said plunger and slidable on said bushing, a rivet post carried by said frame and adapted to support a rivet, an adjusting screw carried by said frame and engaging said rivet post, a spring-cushioned work rest supported on said post, and a projection on the link arranged to engage said plunger at a time subsequent to the initial movement of the lever whereby the set is caused to move downwardly relative to the sleeve and bushing.

5. A machine of the class described, comprising a frame formed with a bearing, a bushing loosely mounted in said bearing, an adjusting screw threaded in said bearing below said bushing and adapted to adjust the position thereof, a rivet post carried by said bushing and formed with a reduced upper end, a rest member formed with a recess and with a bore receiving the reduced end portion of said post, a spring on the reduced portion of said post and in the recess of said rest member whereby said rest member is cushioned on said post, the upper end of said post adapted to receive a rivet which will project above said rest member when the latter is depressed against the action of said spring, a rivet set slidably mounted in said frame above said post, and means for actuating said set.

6. In a machine of the class described, a frame formed with a bearing, a sleeve slidably mounted in said bearing, a bushing carried by the lower end of said sleeve, an adjusting screw threaded in said sleeve and engaging said bushing, a tubular plunger slidably mounted in the upper end of said sleeve, a rivet set threaded into said tubular plunger and extending slidably through said bushing, a stop member on said set engaging the upper end of said bushing, a lever pivoted in said frame, a link pivoted at one end to said lever and at the opposite end to said sleeve and arranged to cause a reciprocation of the latter in said bearing, a member carried by said frame and adapted to be engaged by the punch during the early part of the downward movement of the sleeve whereby said set is caused to move upwardly and the bushing is permitted to engage said member or an object carried thereby, and a projection on the link arranged to engage the upper end of said plunger during the latter part of the downward movement of said sleeve whereby said set is moved downwardly in the bushing to upset a rivet carried by said member.

CARL A. OLSON.
FREDRICK L. BUCH.
THOMAS E. BROOKS.